(12) United States Patent
Ning

(10) Patent No.: US 9,255,981 B2
(45) Date of Patent: Feb. 9, 2016

(54) SUNLIGHT COLLECTION DEVICE AND METHOD FOR TRACKING SUNLIGHT

(71) Applicant: Shenzhen China Star Optoelectronics Technology Co., Ltd., Shenzhen, Guangdong (CN)

(72) Inventor: Chao Ning, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 176 days.

(21) Appl. No.: 14/131,874

(22) PCT Filed: Dec. 5, 2013

(86) PCT No.: PCT/CN2013/088603
§ 371 (c)(1),
(2) Date: Jan. 9, 2014

(87) PCT Pub. No.: WO2015/078034
PCT Pub. Date: Jun. 4, 2015

(65) Prior Publication Data
US 2015/0153438 A1    Jun. 4, 2015

(30) Foreign Application Priority Data

Nov. 29, 2013 (CN) .......................... 2013 1 0627953

(51) Int. Cl.
*F24J 2/54* (2006.01)
*G01S 3/786* (2006.01)
*G01J 1/42* (2006.01)

(52) U.S. Cl.
CPC ................ *G01S 3/7861* (2013.01); *F24J 2/54* (2013.01); *G01J 1/4228* (2013.01); *G01J 2001/4266* (2013.01)

(58) Field of Classification Search
CPC .................. F24J 2/06; F24J 1/00; F24J 2/00; F24J 2/54; H02S 20/32; G01S 3/78
See application file for complete search history.

(56) References Cited

U.S. PATENT DOCUMENTS 4,477,145 A * 10/1984 Mori ........................ F24J 2/067
126/570
2009/0314333 A1* 12/2009 Shepard ................... G02B 6/04
136/248

* cited by examiner

*Primary Examiner* — Francis M Legasse, Jr.
(74) *Attorney, Agent, or Firm* — Andrew C. Cheng

(57) ABSTRACT

The present invention provide a sunlight collection device, it comprises a concentrator array composed by a plurality of concentrators and a light sensor electrically connected to the controller, the concentrator comprises a collecting cup and a collecting lens fixed to the collecting cup, a optical fiber runs through and is fixed at the bottom of the collecting cup, a plurality of light detection units which are electrically connected to the controller are provided around the optical fiber at the bottom of the collecting cup. The sunlight collection device and the method for tracking sunlight can not only locate the sunlight at second level, making the position quicker and more precise, but also making the light sensor and the collector of the sunlight collection device calibrate itself when mechanical deviation occurs, avoiding the phenomenon that although the sensor array precisely locating to sunlight and the light spot which is condensed by the collecting lens deviates the light-receiving of the optical fiber.

17 Claims, 2 Drawing Sheets

SUNLIGHT COLLECTION DEVICE AND METHOD FOR TRACKING SUNLIGHT

BACKGROUND OF THE INVENTION

1. Field of the Invention

The present invention relates to the solar energy development automation field, and in particular to a sunlight collection device and a method for tracking sunlight.

2. The Related Arts

Sunlight is inexhaustible supply green energy, people have been constantly trying to utilize solar energy, such as the well-known solar water heater and the photovoltaic power generation. In recent years, there rises a way of utilizing directly sunlight to light up, namely, collecting sunlight effectively in outdoor and transmitting it to indoor through the optical fiber. It is great significance to the places where the safety is stringently required, such as ammunition depots, oil tanks, mines and other flammable and explosive places as well as the construction where cannot directly receive the sunlight. The core idea of such techniques is to utilize the collecting lens or the condenser mirror, focusing the sunlight on to the fiber, transmitting the sunlight to the place where requires the light through the optical fiber. This lighting technique saves energy and photoelectric isolation, which is a very safe way of lighting. The key of this technique is that highly precisely and automatically tracking the sun, ensuring that the sunlight is gathered on the light-receiving face of the optical fiber. The methods for tracking sun proposed by the current patent are divided into two main categories: one is to control the daylighting illumination device according to the rule of the Earth running around the sun; the other is to tracking the sun by utilizing the photoelectric sensor.

The sunlight collection device which utilizes the photoelectric sensor to track sunlight is to utilize multiple photoelectric sensors to consist of a sensor array, because of the angle between the sunlight and each photoelectric sensor is different, the sunlight signal intensities detected by the respective photoelectric sensors are different. Therefore, the position of the sun can be calculated according to the difference of the signal intensity, thereby, turning on the motor to make the sunlight collection device rotate toward the sun direction. After several probing, calculating, moving, it can make the sunlight collection device achieved better alignment accuracy. However, the mechanical structure of the traditional sunlight collection device is to make a sunlight tracking system, then fixing the collecting lens and the optical fiber on the sunlight tracking system, namely, the sunlight tracking system is separated with the collecting lens and the optical fiber. This separate assembly requires maintaining high mechanical precision during fixing, to ensure the light spot which is condensed by the collecting lens irradiated onto the light-receiving of the optical fiber. If the mechanical alignment is offset due to wind, shaking and other reasons when the system is running, there will occur a phenomenon that although the sensor array precisely locating to sunlight and the light spot which is condensed by the collecting lens deviates the light-receiving of the optical fiber. And the prior art cannot repair itself when this phenomenon occurs, thus it will reduce the lighting collection, thereby reducing the utilization rate of light.

SUMMARY OF THE INVENTION

In order to solve the above issue in the prior art, the purpose in the present invention is to provide a sunlight collection device and a method for tracking sunlight, the sunlight collection device and the method cannot only correct and adjust by itself, but also quickly and precisely locate the sunlight when the system occurs mechanical error.

In order to achieve the above purpose, the present invention provide a sunlight collection device, which comprises a concentrator array composed by a plurality of concentrators and a light sensor electrically connected to the controller, the concentrator comprises a collecting cup and a collecting lens fixed to the collecting cup, a optical fiber runs through and is fixed at the bottom of the collecting cup, a plurality of light detection units which are electrically connected to the controller are provided around the optical fiber at the bottom of the collecting cup.

Wherein, the number of the light detection units is four, which are respectively provided around the optical fiber.

Wherein, the light detection unit is photoelectric sensor.

Wherein, the light-receiver of the optical fiber is provided near the focal point of the collecting lens.

Wherein, the collecting lens is Fresnel lens.

Wherein, the light sensor is located in the middle of concentrator array.

Wherein, the light sensor comprises a plurality of light sensing units.

The other purpose in the present invention is to provide a method for tracking sunlight which utilizes the sunlight collection device as described above, comprising the following steps:

A. Utilizing the light sensor to locate the sunlight at first level, making the optical axis of the collecting lens been substantially parallel with the direction of the sunlight;

B. Utilizing the light detection unit to locate the sunlight at second level, precisely controlling the parallelism between the optical axis of the collecting lens and direction of the sunlight.

Wherein, the step A comprises that the light sensor locates the sunlight, at the same time, feedback the locating information to the controller; the controller controls the operation of the sunlight collection device until the optical axis of the collecting lens is substantially parallel with the direction of the sunlight.

Wherein, the step B comprises that the light detection unit locates the sunlight, at the same time, feedback the locating information to the controller; under the control of the controller, the sunlight collection device operating, precisely controlling the parallelism between the optical axis of the collecting lens and direction of the sunlight.

Wherein, the number of the light detection units is four, which are respectively provided around the optical fiber.

Wherein, the light detection unit is photoelectric sensor.

Wherein, the light-receiver of the optical fiber is provided near the focal point of the collecting lens.

Wherein, the collecting lens is Fresnel lens.

Wherein, the light sensor is located in the middle of concentrator array.

Wherein, the light sensor comprises a plurality of light sensing units.

The present invention provide a sunlight collection device and a method for tracking sunlight, after utilizing the light sensor to locate the sunlight at first level, making the optical axis of the collecting lens been substantially parallel with the direction of the sunlight, utilizing the light detection unit to locate the sunlight at second level. It does not only make the position quicker and more precise, but also make the light sensor and the collector of the sunlight collection device calibrate itself when mechanical deviation occurs, avoiding the phenomenon that although the sensor array precisely locating to sunlight and the light spot which is condensed by the collecting lens deviates the light-receiving of the optical fiber. The requirement of the mechanical precision of the sunlight collection device is low, and the structure is simple, it is convenient to mass production.

DETAILED DESCRIPTION OF THE PREFERRED EMBODIMENTS

Figure 1:
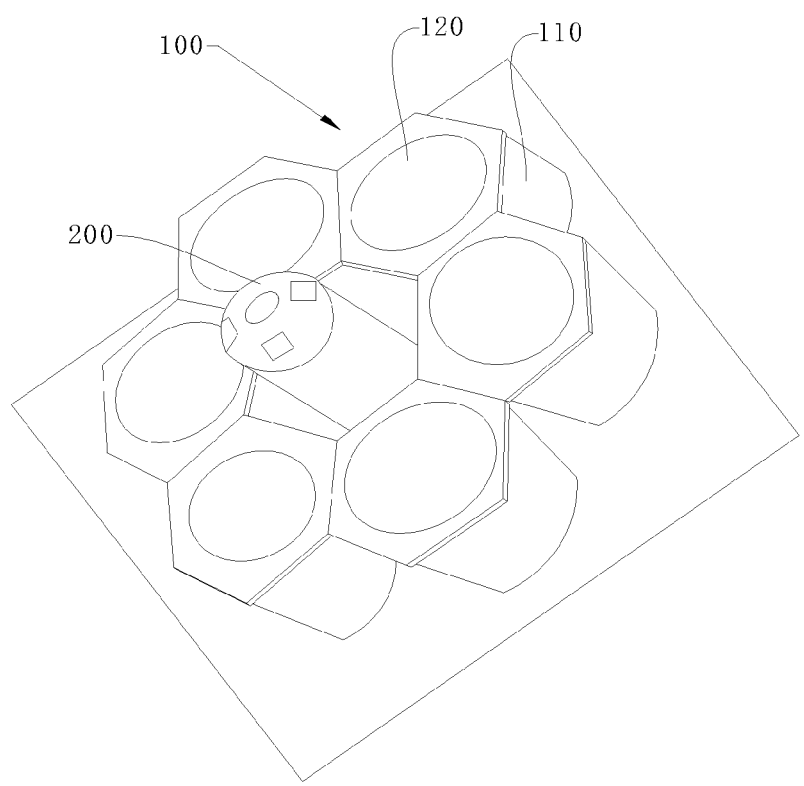
FIG. 1 is a schematic diagram of the sunlight collection device provided by an embodiment in the present invention.

Now describing in detail with the embodiment in the present invention, examples of which are shown in the drawings, wherein, the same reference numerals represent the same parts. The following descriptions of the embodiment explain the present invention through the reference drawings.

Referring FIG. 1, which is a schematic diagram of the sunlight collection device provided by an embodiment in the present invention, the sunlight collection device comprises a concentrator array composed by a plurality of concentrators 100 and a light sensor 200 electrically connected to the controller, wherein, the light sensor 200 is utilized to locate the sunlight at first level, making the optical axis of the collecting lens 110 provided on the concentrator 100 is parallel with the direction of the sunlight, it makes the concentrator 100 collect the sunlight more efficiently. In the present embodiment, the light sensor 200 is provided in the middle of concentrator array, in order to more easily control the precision of sunlight collection device locating the sunlight. Wherein, in the other embodiment, the light sensor 200 can be also provided on the other position.

Figure 2:
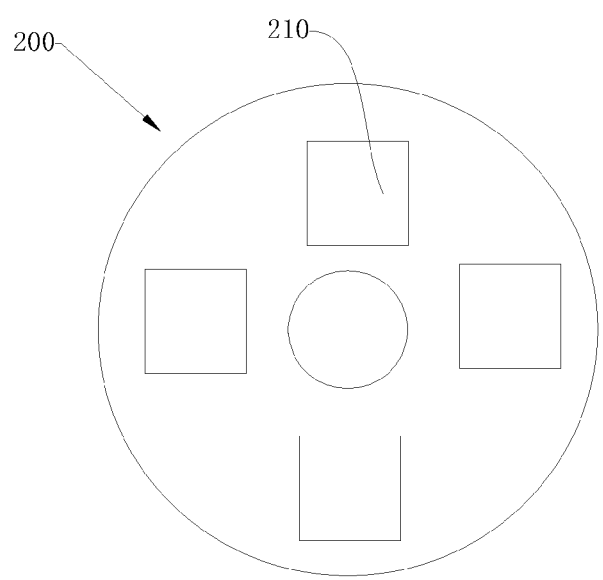
FIG. 2 is a top view of the light sensor of the sunlight collection device in FIG. 1.

Referring to FIG. 2, which is a top view of the light sensor 200 of the sunlight collection device, the light sensor 200 comprises a plurality of light sensing units 210 provided on it. In the present embodiment, the top of light sensor 200 is a convex spherical surface, on all sides of the convex spherical surface are respectively provided a light sensing unit 210. Wherein, light sensing unit 210 is photoelectric diode. Of course, in other embodiments, the sense unit 210 also can be one of the photoelectric sensors such as the photodiode, the photoresistor or the phototriode. The light sensor 200 utilizes the difference of the sunlight signal intensity detected by four light sensing unit 210 of which the locations are different, thereby calculating the angles between the respective light sense 210 and the sunlight, further determining the location of the sun.

Figure 3:
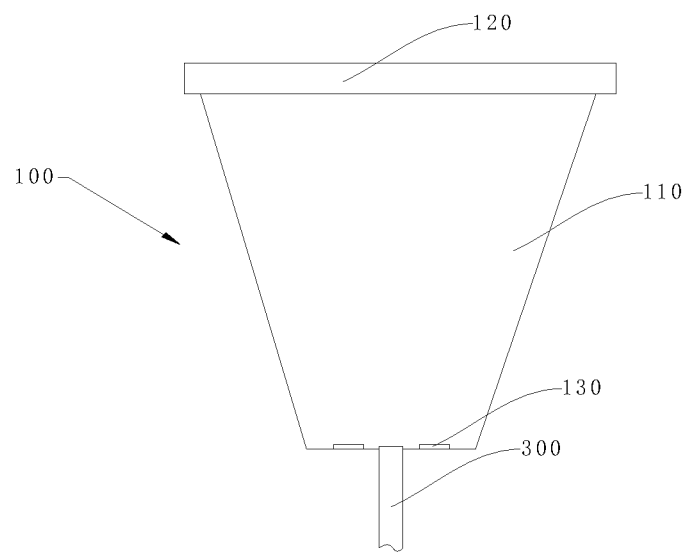
FIG. 3 is a schematic diagram of the collector of sunlight collection device in FIG. 1.
Figure 4:
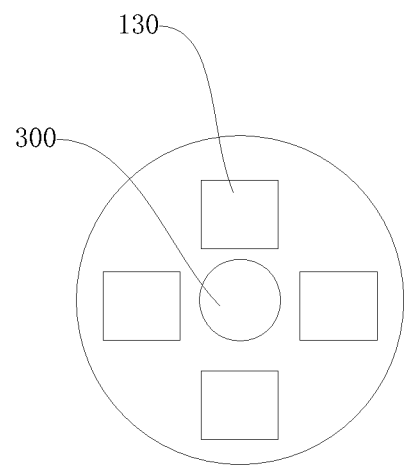
FIG. 4 is a schematic diagram of the bottom of the collecting cup in FIG. 1.

Referring to FIG. 3 and FIG. 4, which are respectively a schematic diagram of the collector 100 and a schematic diagram of the bottom of the collecting cup 120, the collector 100 comprises a collecting cup 120 and a collecting lens 110 fixed on the collector cup 120. The purpose of the collecting lens 110 is to focus the sunlight into its focal point, forming a light spot. In the present embodiment, the collecting lens 110 is a Fresnel lens which is planar form, comparing with the ordinary convex lens, Fresnel lens has lower cost. The optical fiber 300 runs through and is fixed at the bottom of the collecting cup, wherein, the light-receiver of the optical fiber 300 faces up and is located near the focal point of the collecting lens 110. The sunlight focuses on the light-receiver of the optical fiber 300 through the collecting lens 110, which is transmitted to the lighting required places through the optical fiber 300. There is a plurality of light detection units 130 electrically connected to the controller which is provided around the optical fiber 300 at the bottom of the collecting cup 120. Wherein, the light detection unit 130 is one of the photoelectric sensors such as photoelectric diode, photodiode, phototriode or photoresistor, etc. Or the light detection unit 130 also can be one of the photovoltaic cell, the thermal diode, the thermistor or the thermocouple. In a preferred embodiment, the number of the light detection units 130 is four, which are respectively provided around the optical fiber 300. The collector 100 can detect the difference of the sunlight signal intensity through utilizing these four light detection units 130, thereby calculate the angles between the respective light sense 210 and the sunlight, further tracking the sunlight at second level, precisely controlling the parallelism between the optical axis of the collecting lens and direction of the sunlight.

According to the sunlight collection device provided in the present invention, an embodiment in the present invention also provides a method for tracking sunlight, which comprises the following steps: A. utilizing the light sensor 200 to locate the sunlight at first level, making the optical axis of the collecting lens 110 been substantially parallel with the direction of the sunlight; B. utilizing the light detection unit 130 to locate the sunlight at second level, precisely controlling the parallelism between the optical axis of the collecting lens 110 and direction of the sunlight.

Wherein, step A specifically is: light sensor 200 utilizes four light sensing unit 210 of which the locations are different to detect the sunlight, and feedback the detected signal to the controller; the controller simply determines the location of the sunlight according to the difference of the sunlight signal intensity detected by the different light sensing unit 210; under the control of the controller, the sunlight collection device rotates to the direction of sunlight. Repeat the step A until to the sunlight intensity signal which is detected by the four light sensing units 210 of which the locations are different is substantially the same, it means that the sunlight collecting device is facing to the sunlight, it also means that the optical axis of the collecting lens 110 is substantially parallel.

In order to more precisely control the parallelism between the optical axis of the collecting lens 110 and the direction of sunlight, the step B is specifically: four light detection units 130 detect the sunlight signal, and feedback the detected signal to the controller; the controller determines the location of sunlight according to the difference of the sunlight signal intensity detected by the different light detection units 130; under the control of the controller, the sunlight collection device rotates to the direction of the sunlight. Repeat the step B until to the sunlight intensity signal which is detected by the four light detection units 130 of which the locations are different is substantially the same, at this time, the optical axis of the collecting lens 110 highly keeps in parallel with direction of sunlight.

The method for tracking sunlight provided in the present invention can precisely control the parallelism between the optical axis of the collecting lens 110 and the direction of sunlight, making the light spot after the collecting lens 110 condensing precisely incident to the end of the light-receiver of the optical fiber 300, improve the collection of the light, further raising the utilization of the light.

In summary, the sunlight collection device and the method for tracking sunlight provided in the present invention locate the sunlight at first level through the light sensor, after making the optical axis of the collecting lens keep in parallel with the direction of sunlight, locating the sunlight at second level through the light detection unit provided at the bottom the collector. It doesn't only make position quicker and more precise, but also can correct and adjust itself when the light sensor and the collector of the sunlight detection device occur the mechanical deviation, avoiding the phenomenon that although the sensor array precisely locating to sunlight and the light spot which is condensed by the collecting lens deviates the light-receiving of the optical fiber. The requirement of the mechanical precision of the sunlight collection device is low, and the structure is simple, it is convenient for mass production.

It needs to notice that, in this article, the relational terms such as first and second is only used to distinguish one entity or operating another entity or an operation, it is not necessary to require or imply that there exists any such relationship or sequence between the entity and operation. Besides, the terms "comprise," "include," or any other variation are intended to cover a non-exclusive inclusion, thereby making that comprising a series of process, method, materials or apparatus of element not only comprise those elements, but also comprise other elements not expressly listed, or also comprise such inherent elements of process, method, materials or apparatus. In the absence of more restrictive conditions, limiting the elements by the statement "comprises a . . . ", it doesn't exclude that it also exists other identical elements in comprising the process, method, materials or apparatus of element.

While the present invention is specifically described and illustrated by referring to the embodiment of example, ordinary technical personnel in this art should understand, under the circumstance of without departing from the spirit and scope of the present invention defined in the claims, the various changes in form and details are acceptable.

What is claimed is:

1. A sunlight collection device, comprising: a concentrator array composed by a plurality of concentrators and a light sensor electrically connected to the controller for locating the sunlight at first stage, the concentrator comprising a collecting cup and a collecting lens fixed to the collecting cup, a optical fiber running through and being fixed at the bottom of the collecting cup, light-receiver of the optical fiber facing up and being located near the focal point of the collecting lens, a plurality of light detection units for locating the sunlight at second stage which are electrically connected to the controller being provided around the optical fiber at the bottom of the collecting cup.

2. The sunlight collection device as claimed in claim 1, wherein, the number of the light detection units is four, which are respectively provided around the optical fiber.

3. The sunlight collection device as claimed in claim 2, wherein, the light detection unit is photoelectric sensor.

4. The sunlight collection device as claimed in claim 1, wherein, the light detection unit is photoelectric sensor.

5. The sunlight collection device as claimed in claim 1, wherein, the light-receiver of the optical fiber is provided near the focal point of the collecting lens.

6. The sunlight collection device as claimed in claim 1, wherein, the collecting lens is Fresnel lens.

7. The sunlight collection device as claimed in claim 1, wherein, the light sensor is located in the middle of concentrator array.

8. The sunlight collection device as claimed in claim 1, wherein, the light sensor comprises a plurality of light sensing units.

9. A method for tracking sunlight, utilizing the sunlight collection as claimed in claim 1, which comprises the following steps:
   A. Utilizing the light sensor to locate the sunlight at first stage, making the optical axis of the collecting lens been substantially parallel with the direction of the sunlight;
   B. Utilizing the light detection unit to locate the sunlight at second stage, precisely controlling the parallelism between the optical axis of the collecting lens and direction of the sunlight.

10. The method for tracking sunlight as claimed in claim 9, wherein, the step A comprises that the light sensor locates the sunlight, at the same time, feedback the locating information to the controller; the controller controls the operation of the sunlight collection device until the optical axis of the collecting lens is substantially parallel with the direction of the sunlight.

11. The method for tracking sunlight as claimed in claim 9, wherein, the step B comprises that the light detection unit locates the sunlight, at the same time, feedback the locating information to the controller; under the control of the controller, the sunlight collection device operating, precisely controlling the parallelism between the optical axis of the collecting lens and direction of the sunlight.

12. The method for tracking sunlight as claimed in claim 9, wherein, the number of the light detection units is four, which are respectively provided around the optical fiber.

13. The method for tracking sunlight as claimed in claim 9, wherein, the light detection unit is photoelectric sensor.

14. The method for tracking sunlight as claimed in claim 9, wherein, the light-receiver of the optical fiber is provided near the focal point of the collecting lens.

15. The method for tracking sunlight as claimed in claim 9, wherein, the collecting lens is Fresnel lens.

16. The method for tracking sunlight as claimed in claim 9, wherein, the light sensor is located in the middle of concentrator array.

17. The method for tracking sunlight as claimed in claim 9, wherein, the light sensor comprises a plurality of light sensing units.

* * * * *